US009900741B2

United States Patent
Lu et al.

(10) Patent No.: US 9,900,741 B2
(45) Date of Patent: Feb. 20, 2018

(54) METHOD FOR IMPLEMENTING GEO-FENCING AND MOBILE DEVICE

(71) Applicant: Huawei Technologies Co., Ltd., Shenzhen (CN)

(72) Inventors: Henghui Lu, Beijing (CN); Shuiping Long, Beijing (CN); Xiaochen Chen, Shanghai (CN)

(73) Assignee: HUAWEI TECHNOLOGIES, LTD., Shenzhen (CN)

( * ) Notice: Subject to any disclaimer, the term of this patent is extended or adjusted under 35 U.S.C. 154(b) by 0 days.

(21) Appl. No.: 15/537,653

(22) PCT Filed: Dec. 17, 2014

(86) PCT No.: PCT/CN2014/094044
§ 371 (c)(1),
(2) Date: Jun. 19, 2017

(87) PCT Pub. No.: WO2016/095120
PCT Pub. Date: Jun. 23, 2016

(65) Prior Publication Data
US 2017/0359685 A1    Dec. 14, 2017

(51) Int. Cl.
*H04W 4/021* (2018.01)
*H04W 4/02* (2018.01)
*H04W 52/02* (2009.01)

(52) U.S. Cl.
CPC ............ *H04W 4/021* (2013.01); *H04W 4/023* (2013.01); *H04W 52/0206* (2013.01)

(58) Field of Classification Search
CPC ..... H04W 4/021; H04W 4/185; H04W 40/20; H04W 4/02; H04W 4/028; H04W 4/04;
(Continued)

(56) References Cited

U.S. PATENT DOCUMENTS 8,538,393 B1    9/2013   Beyer, Jr. et al.
8,755,824 B1 *  6/2014   Wang ................... H04W 4/021
                                                340/539.13
(Continued)

FOREIGN PATENT DOCUMENTS

CN    102761822 A    10/2012
CN    102938927 A    2/2013
(Continued)

OTHER PUBLICATIONS

Machine Translation and Abstract of Chinese Publication No. CN102761822, Oct. 31, 2012, 7 pages.
(Continued)

*Primary Examiner* — Meless Zewdu
(74) *Attorney, Agent, or Firm* — Conley Rose, P.C.

(57) ABSTRACT

A method includes determining a first coordinate representing the geo-fence in a first coordinate system when it is detected that a geo-fence is set, where the first coordinate system is a coordinate system used by the geo-fence, converting the first coordinate into a second coordinate representing the geo-fence in a second coordinate system, where the second coordinate system is a coordinate system set to implement geo-fencing by a positioning technology, and the first coordinate system is different from the second coordinate system, comparing a coordinate of a positioning result determined using the positioning technology with the second coordinate representing the geo-fence, and triggering a preset event when a relationship between the coordinate of the positioning result and the second coordinate representing the geo-fence satisfies a trigger condition.

9 Claims, 4 Drawing Sheets

(58) Field of Classification Search
CPC . H04W 52/0251; H04W 60/06; H04W 64/00; H04W 68/00; H04W 60/00; H04W 60/04; H04W 4/023; G01S 7/295; G01S 7/2955; G01S 7/53; G01S 19/42
See application file for complete search history.

(56) References Cited

U.S. PATENT DOCUMENTS

| | | | | |
|---|---|---|---|---|
| 9,066,464 | B2* | 6/2015 | Schmidt | A01B 69/00 |
| 9,078,098 | B1* | 7/2015 | Cronin | H04W 4/021 |
| 9,674,658 | B2* | 6/2017 | Partheesh | H04W 4/021 |
| 2007/0143013 | A1* | 6/2007 | Breen | G01S 5/0027 701/32.3 |
| 2009/0243925 | A1* | 10/2009 | Kellermeier | B60R 25/102 342/357.64 |
| 2012/0309376 | A1 | 12/2012 | Huang et al. | |
| 2013/0093627 | A1 | 4/2013 | Cosman | |
| 2013/0203442 | A1 | 8/2013 | LeBlanc et al. | |
| 2014/0162692 | A1* | 6/2014 | Li | H04L 67/40 455/456.3 |
| 2014/0337123 | A1* | 11/2014 | Nuernberg | G06Q 30/0246 705/14.45 |
| 2014/0370910 | A1* | 12/2014 | Natucci, Jr. | H04W 4/022 455/456.1 |
| 2015/0181382 | A1* | 6/2015 | McDonald | H04W 4/021 455/456.3 |
| 2015/0237470 | A1* | 8/2015 | Mayor | H04W 4/021 455/456.2 |
| 2016/0014559 | A1* | 1/2016 | Hakanson | H04W 4/021 455/456.1 |

FOREIGN PATENT DOCUMENTS

| | | |
|---|---|---|
| CN | 103248999 A | 8/2013 |
| EP | 1557807 A2 | 7/2005 |
| WO | 2007069890 A1 | 6/2007 |

OTHER PUBLICATIONS

Foreign Communication From a Counterpart Application, PCT Application No. PCT/CN2014/094044, English Translation of International Search Report dated Aug. 28, 2015, 2 pages.

Foreign Communication From a Counterpart Application, PCT Application No. PCT/CN2014/094044, English Translation of Written Opinion dated Aug. 28, 2015, 6 pages.

Foreign Communication From A Counterpart Application, European Application No. 14908155.6, Extended European earch Report dated Nov. 22, 2017, 10 pages.

* cited by examiner

METHOD FOR IMPLEMENTING GEO-FENCING AND MOBILE DEVICE

CROSS-REFERENCE TO RELATED APPLICATION

This application is a U.S. National Stage of International Patent Application No. PCT/CN2014/094044 filed Dec. 17, 2014, which is incorporated by reference herein in its entirety.

TECHNICAL FIELD

The present disclosure relates to the field of mobile communications, and in particular, to a method for implementing geo-fencing and a mobile device.

BACKGROUND

Geo-fencing is a technology for monitoring a relationship between a mobile device and a specific geographic area and providing an information service according to the relationship. The specific geographic area is determined by a geo-fence. A process for implementing geo-fencing is as follows. First, establish a geo-fence, next, start real-time positioning, then, compare a coordinate of the geo-fence with a coordinate of a positioning result to determine whether a mobile device is located inside or outside the geo-fence, and at last, perform a corresponding operation according to a determining result, such as sending a reminder and a warning message or displaying a positioning point on a map.

The coordinate of the geo-fence and the coordinate of the positioning result both use a same coordinate system. However, in an actual application, a coordinate system of the geo-fence is often inconsistent with that of the positioning result, and there is a relatively large deviation. For example, when a user establishes a geo-fence by taking points directly from a map using a GCJ02, BD09, or BD09LL coordinate system and uses a Global Positioning System (GPS) as a positioning technology, the coordinate system of the geo-fence is different from a coordinate system WGS84 used by a positioning result obtained using the GPS.

As regards the foregoing problem, the other approaches provide another method for implementing geo-fencing, where coordinate systems that may be respectively used by a geo-fence and a positioning result are directly stipulated, and conversion between coordinate systems is implemented inside. Each time positioning is successful, a coordinate of the positioning result is converted into a coordinate in the coordinate system used by the geo-fence, and then the coordinate, of the positioning result, that is obtained by means of the conversion are compared with the coordinate of the geo-fence. However, in this method, a positioning result may be obtained at intervals each time geo-fencing is started (for example, a positioning result is obtained every 20 seconds). Because coordinate conversion needs to be performed on each positioning result and subsequently a coordinate, of each positioning result, that is obtained by means of the conversion is compared with a coordinate of a geo-fence, a whole operation process is complicated, causing relatively large power consumption for implementing geo-fencing.

SUMMARY

Embodiments of the present disclosure provide a method for implementing geo-fencing and a mobile device in order to effectively lower power consumption for implementing geo-fencing.

A first aspect provides a method for implementing geo-fencing, including determining a first coordinate representing the geo-fence in a first coordinate system when it is detected that a geo-fence is set, where the first coordinate system is a coordinate system used by the geo-fence, converting the first coordinate into a second coordinate representing the geo-fence in a second coordinate system, where the second coordinate system is a coordinate system that is set to implement geo-fencing and that is used by a positioning technology, and the first coordinate system is different from the second coordinate system, comparing a coordinate of a positioning result determined using the positioning technology with the second coordinate representing the geo-fence, and triggering a preset event when a relationship between the coordinate of the positioning result and the second coordinate representing the geo-fence satisfies a trigger condition.

With reference to the first aspect, in a first implementation manner of the first aspect, converting the first coordinate into a second coordinate representing the geo-fence in a second coordinate system includes converting the first coordinate into the second coordinate representing the geo-fence in the second coordinate system using an iterative offset estimation algorithm.

With reference to the first aspect, in a second implementation manner of the first aspect, converting the first coordinate into a second coordinate representing the geo-fence in a second coordinate system includes converting the first coordinate into the second coordinate representing the geo-fence in the second coordinate system according to a preset conversion model.

A second aspect provides a mobile device, including a detection module configured to detect whether a geo-fence is set, a determining module configured to determine a first coordinate representing the geo-fence in a first coordinate system when the detection module detects that the geo-fence is set, where the first coordinate system is a coordinate system used by the geo-fence, a conversion module configured to convert the first coordinate determined by the determining module into a second coordinate representing the geo-fence in a second coordinate system, where the second coordinate system is a coordinate system that is set to implement geo-fencing and that is used by a positioning technology, and the first coordinate system is different from the second coordinate system, a positioning module configured to determine a positioning result of the mobile device using the positioning technology, a comparison module configured to compare a coordinate of the positioning result determined by the positioning module with the second coordinate representing the geo-fence, and a trigger module configured to trigger a preset event when a relationship between the coordinate of the positioning result determined by the positioning module and the second coordinate representing the geo-fence satisfies a trigger condition.

With reference to the second aspect, in a first implementation manner of the second aspect, the conversion module is further configured to convert the first coordinate into the second coordinate representing the geo-fence in the second coordinate system using an iterative offset estimation algorithm.

With reference to the second aspect, in a second implementation manner of the second aspect, the conversion module is further configured to convert the first coordinate into the second coordinate representing the geo-fence in the second coordinate system according to a preset conversion model.

A third aspect provides a mobile device, including a memory and a processor, where the memory stores one group of program code, and the processor is configured to call the program code stored in the memory and perform the operations of determining a first coordinate representing the geo-fence in a first coordinate system when it is detected that a geo-fence is set, where the first coordinate system is a coordinate system used by the geo-fence, converting the first coordinate into a second coordinate representing the geo-fence in a second coordinate system, where the second coordinate system is a coordinate system that is set to implement geo-fencing and that is used by a positioning technology, and the first coordinate system is different from the second coordinate system, comparing a coordinate of a positioning result determined using the positioning technology with the second coordinate representing the geo-fence, and triggering a preset event when a relationship between the coordinate of the positioning result and the second coordinate representing the geo-fence satisfies a trigger condition.

With reference to the third aspect, in a first implementation manner of the third aspect, the processor is further configured to convert the first coordinate into the second coordinate representing the geo-fence in the second coordinate system using an iterative offset estimation algorithm.

With reference to the third aspect, in a second implementation manner of the third aspect, the processor is further configured to convert the first coordinate into the second coordinate representing the geo-fence in the second coordinate system according to a preset conversion model.

In the present disclosure, because before a positioning result determined using a positioning technology is obtained, a first coordinate of a geo-fence in a first coordinate system used by the geo-fence is first converted into a second coordinate representing the geo-fence in a second coordinate system used by the positioning technology. In this way, when each positioning result is compared with the geo-fence subsequently, the positioning result does not need to be converted into a positioning result in a coordinate system used by a geo-fence. Coordinate conversion is performed only once in a whole process. Compared with the background technology in which coordinate conversion needs to be performed on each positioning result once, the present disclosure can greatly lower operation complexity of geo-fencing in order to lower power consumption of geo-fencing, and can resolve a location deviation problem caused by different coordinate systems of a geo-fence and a positioning result.

DESCRIPTION OF EMBODIMENTS

Embodiments of the present disclosure provide a method for implementing geo-fencing and a mobile device, to lower power consumption for implementing geo-fencing.

To make a person skilled in the art understand the technical solutions in the present disclosure better, the following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The terms "include", "contain" and any other variants in the specification, claims, and the accompanying drawings of the present disclosure mean to cover the non-exclusive inclusion, for example, a process, method, system, product, or device that includes a list of steps or units is not necessarily limited to those units, but may include other units not expressly listed or inherent to such a process, method, system, product, or device.

It should be noted that geo-fencing involved in this text may be embodied as an application or a function in a device, and a geo-fence is a fence that is set by a user on a screen of the device.

Figure 1:
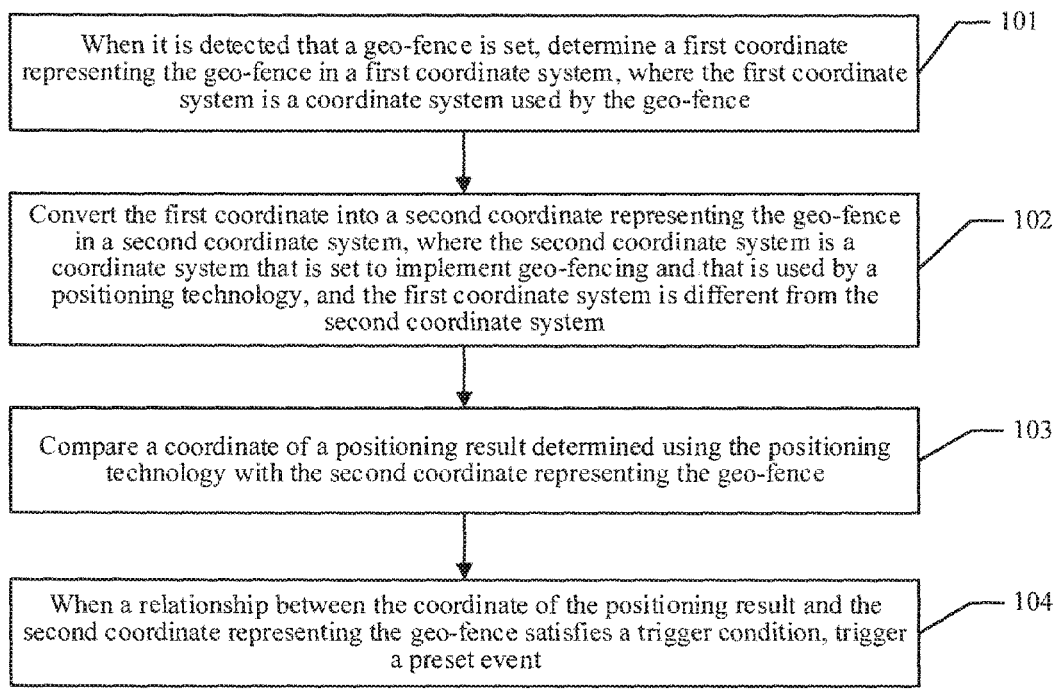
FIG. 1 is a flowchart of an embodiment in a method for implementing geo-fencing according to the present disclosure.

Referring to FIG. 1, a method for implementing geo-fencing in one embodiment of the present disclosure includes the following steps.

Step 101: When it is detected that a geo-fence is set, determine a first coordinate representing the geo-fence in a first coordinate system, where the first coordinate system is a coordinate system used by the geo-fence.

When different setting methods are used for the geo-fence, because the different setting methods may use different coordinate systems, the geo-fence may have different coordinates in the different setting methods. A coordinate of the geo-fence and a coordinate system in which the coordinate is are determined when it is detected that the geo-fence is set. In order to facilitate description, the coordinate is referred to as the first coordinate, and the coordinate system is the first coordinate system.

It should be noted that "the geo-fence is set" may be understood as a geo-fence obtained by a user by sliding a finger on a screen of a device, a geo-fence that a user selects a device to save, or a geo-fence obtained by a user by entering a center of a circle and a radius on a screen of a device and by loading using another application. "A first coordinate representing the geo-fence in a first coordinate system" may be understood as the first coordinate in the first coordinate system may represent the geo-fence. The first coordinate may be a set of multiple coordinates or one coordinate.

It should be understood that different geo-fences may use same or different coordinate systems, which is not limited herein.

Step 102: Convert the first coordinate into a second coordinate representing the geo-fence in a second coordinate system, where the second coordinate system is a coordinate system that is set to implement geo-fencing and that is used by a positioning technology, and the first coordinate system is different from the second coordinate system.

A mobile device obtains a positioning result according to a specified positioning technology and compares the obtained positioning result with a geographic area encircled by the geo-fence in order to determine a relationship between the geo-fence and the positioning result when geo-fencing is implemented. During comparison, the mobile device compares a coordinate of the geo-fence with a coordinate of the positioning result. However, the coordinate system (that is, the first coordinate system) used by the geo-fence and the coordinate system (that is, the second coordinate system) that is set to implement geo-fencing and that is used by the positioning technology are not necessarily a same coordinate system. Therefore, when the first coordinate system is different from the second coordinate system, the first coordinate is converted into the second coordinate representing the geo-fence in the second coordinate system. It should be understood "a second coordinate representing the geo-fence in a second coordinate system" may be understood as the second coordinate in the second coordinate system may represent the geo-fence. The second coordinate may be a set of multiple coordinates or one coordinate.

In an actual application, before the first coordinate is converted into the second coordinate, whether the first coordinate system and the second coordinate system are the same may be first determined, if the first coordinate system and the second coordinate system are the same, the first coordinate does not need to be converted, or if the first coordinate system and the second coordinate system are different, the first coordinate is converted into the second coordinate. Alternatively, whether the first coordinate system and the second coordinate system are the same may not be determined, but the first coordinate is directly converted into the second coordinate. If the first coordinate system and the second coordinate system are the same, a second coordinate obtained by means of conversion and the first coordinate are the same, or if the first coordinate system and the second coordinate system are different, a second coordinate obtained by means of conversion and the first coordinate are different.

There are multiple methods for converting the first coordinate into the second coordinate. For example, a conversion model needed when a coordinate system that the first coordinate system may use is converted into a coordinate system that the second coordinate system may use may be preset. When the first coordinate is converted into the second coordinate, a conversion model that is suitable to be currently used is selected from various conversion models, and conversion is performed according to the conversion model.

It should be understood that when it is detected that at least two geo-fences are set, a first coordinate of each geo-fence is converted.

Step 103: Compare a coordinate of a positioning result determined using the positioning technology with the second coordinate representing the geo-fence.

There are multiple location technologies, for example, any one or more of the Global Navigation Satellite System (GNSS), cellular positioning, WI-FI positioning, sensor positioning, BLUETOOTH positioning, or the like. The GNSS may be at least one of the GPS, the BeiDou Navigation Satellite System (BDS), the Galileo Positioning System, or the like. Different location technologies may use same or different coordinate systems.

In a process for implementing geo-fencing, after the positioning technology is selected, a positioning function corresponding to the positioning technology is started. A time for starting the positioning function may be before a time when the first coordinate is converted into the second coordinate or after a time when the first coordinate is converted into the second coordinate, which is not limited herein.

In an actual application, a frequency for positioning in each positioning technology may be preset. For example, positioning is performed 60 times within each minute, or positioning is performed 30 times within each minute. Frequencies for positioning in different location technologies may be the same or may be different, which is not limited herein. Each time one positioning result is obtained, a coordinate of the positioning result is compared with the second coordinate of the geo-fence.

It should be understood that when it is detected that at least two geo-fences are set, a second coordinate of each geo-fence is compared with the coordinate of the positioning result.

Step 104: When a relationship between the coordinate of the positioning result and the second coordinate representing the geo-fence satisfies a trigger condition, trigger a preset event.

For example, the trigger condition may be that the positioning result is located within the geo-fence or the positioning result is located within a preset area near the geo-fence. When the trigger condition is satisfied, the preset event may be pushing advertisement information related to the preset area, automatically logging in to a social network of the preset area, displaying a real-time location, or the like. Alternatively, the trigger condition may be that the positioning result is located outside the geo-fence. When the trigger condition is satisfied, the preset event may be automatically exiting a social network of the preset area, or the like.

Certainly, the foregoing description for the trigger condition and the preset event is only provided using examples and is not limited. Preferably, multiple alternative trigger conditions and trigger events may be preset. After a user completes setting, the mobile device performs, according to a trigger condition that is selected and set, a preset event that is selected and set.

When it is detected that at least two geo-fences are set, different geo-fences may correspond to same or different preset events, and trigger conditions that need to be satisfied between the positioning result and different geo-fences may be the same or different. Priorities of preset events corresponding to different geo-fences may also be preset. The preset event is performed according to the priorities when corresponding trigger conditions are simultaneously satisfied between the positioning result and at least two geo-fences.

In this embodiment, because before a positioning result determined using a positioning technology is obtained, a first coordinate of a geo-fence in a first coordinate system used by the geo-fence is first converted into a second coordinate representing the geo-fence in a second coordinate system used by the positioning technology. In this way, when each positioning result is compared with the geo-fence subsequently, the positioning result does not need to be converted into a positioning result in a coordinate system used by a geo-fence. Coordinate conversion is performed only once in a whole process. Compared with the background technology in which coordinate conversion needs to be performed on each positioning result once, the present disclosure can greatly lower operation complexity of geo-fencing in order to lower power consumption of geo-fencing, and can resolve a location deviation problem caused by different coordinate systems of a geo-fence and a positioning result.

In this embodiment, when steps 101 to 104 are performed, steps 101 to 104 may be performed by a mobile device (such as a mobile phone or a tablet computer) or an application processor (AP). Preferably, steps 101 to 104 may also be performed by a low-power-consumption processor independent of an AP or a low-power-consumption system on chip (SoC) independent of an AP. The low-power-consumption processor and the low-power-consumption SoC respectively refer to a processor and an SoC whose power consumption is less than power consumption of an AP. In this way, power consumption needed during geo-fencing can be lowered.

In this embodiment, the mobile device needs to use a positioning technology for positioning. In an actual application, not only one positioning technology may be used for positioning, at least two location technologies may also be used, and switching is performed between the at least two location technologies during positioning. Preferably, one or more location technologies used for geo-fencing may be preset.

When a positioning mode for switching between at least two location technologies is used, in step 102, for each geo-fence, the first coordinate of the geo-fence needs to be separately converted into new coordinates representing the geo-fence in coordinate systems used by different location technologies. In step 103, when the geo-fence is compared with each positioning result, a new coordinate, in a coordinate system corresponding to the positioning result, of the geo-fence is first determined, and then the determined new coordinate is compared with the coordinate of the positioning result.

In this embodiment, the first coordinate needs to be converted into the second coordinate representing the geo-fence in the second coordinate system. Preferably, the first coordinate is converted into the second coordinate representing the geo-fence in the second coordinate system using an iterative offset estimation algorithm. The iterative offset estimation algorithm is explained below.

Figure 2:
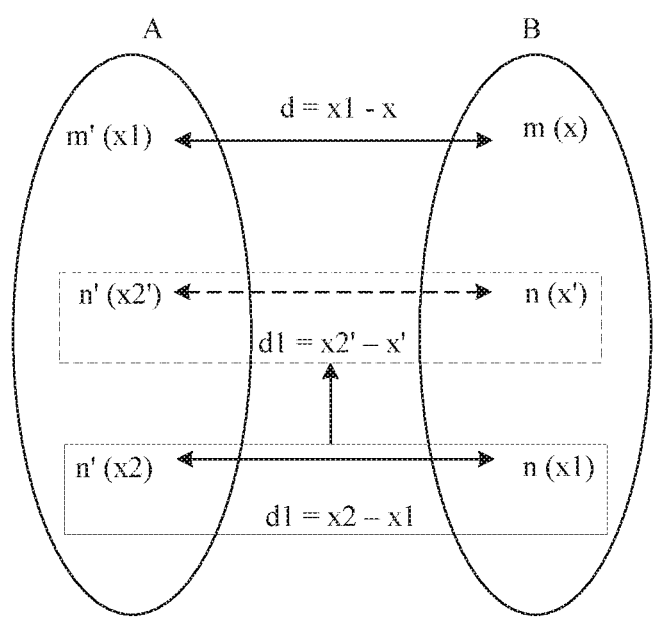
FIG. 2 is a schematic diagram of use of an iterative offset estimation algorithm in a method for implementing geo-fencing according to the present disclosure.

To conveniently describe the iterative offset estimation algorithm, it is first noted a transformation model in which a coordinate system B used by any positioning technology within a mobile device is converted into a coordinate system A used by a geo-fence (referred to as a B-A transformation model) is stored in the mobile device. Referring to FIG. 2, FIG. 2 is a schematic diagram of use of an iterative offset estimation algorithm in a method for implementing geo-fencing according to the present disclosure.

It is assumed that a first coordinate at a target location is a coordinate in one-dimensional space. It is known that a coordinate of the target location in a one-dimensional coordinate system A (that is, a first coordinate system) is x1 (that is, the first coordinate), and a coordinate value x (that is, a second coordinate) in a one-dimensional coordinate system B (that is, a second coordinate system) corresponding to x1 is to be solved. The iterative offset estimation algorithm is described in detail below.

Step a: Estimate an offset value between the first coordinate x1 and the second coordinate x. There are the following two reasonable assumptions about coordinate transformation.

1: For any two adjacent points (referred to as a point 1 and a point 2) in the coordinate system B, the two points are separately mapped to the coordinate system A to obtain two mapping points (referred to as a point 1' and a point 2'), and an offset between the point 1' and the point 1 is approximate to an offset between the point 2' and the point 2.

2: A coordinate value a of one point in the coordinate system A is close to a coordinate value b of the point in the coordinate system B in distance.

As shown in FIG. 2, a coordinate value of a point m in the coordinate system B is x, and a coordinate value of a point m' mapped to the coordinate system A is x1. A coordinate value of a point n in the coordinate system B is x1, and a coordinate value of a point n' mapped to the coordinate system A is x2, where x2 is a coordinate value obtained when x1 in the coordinate system B that is calculated according to the B-A transformation model is mapped to the coordinate system A.

According to the foregoing second reasonable assumption, x and x1 are close in distance. Therefore, the point m and the point n in the coordinate system B are adjacent. Further, according to the foregoing first reasonable assumption, an offset d between the point m' and the point m is close to an offset d1 between the point n' and the point n, where d=x1−x, d1=x2−x1, that is, d≈d1.

Step b: Calculate an estimated value x' of x. Because d≈d1, x1−x≈x2−x1, and then x≈x1−(x2−x1), that is, x'=x1−(x2−x1).

Step c: Perform an iterative operation. As shown in FIG. 2, because x' is closer to real x than x1, the coordinate value of the point n in the coordinate system B is replaced with x'. It is calculated according to the B-A transformation model that a coordinate value of a mapping point, in the coordinate system A, of a point whose coordinate value in the coordinate system B is x' is x2', that is, the coordinate value of the point n' in the coordinate system A is replaced with x2'. Therefore, a new offset value d1=x2'−x' is closer to an offset value d than old d1=x2−x1. Therefore, x2'−x'≈x1−x. Therefore, x≈x1−(x2'−x'), that is, a new estimation value of x, x"=x1−(x2'−x').

Similarly, x" is closer to real x than x'. Therefore, the coordinate value of the point n is replaced with x". Step c is repeated until an absolute value of a difference between x1 and a coordinate value obtained when the replaced coordinate value of the point n is mapped to the coordinate system A is less than a preset value, that is, a distance between the point n' and the point m' that are recently obtained in the coordinate system A is less than a preset value. Then an estimated value close to real x is obtained. The preset value is set by the mobile device according to requirements, for example, is set according to requirements such as a delay and calculation complexity.

As regards a two-dimensional coordinate and a three-dimensional coordinate, a conversion principle of each dimension is the same as conversion of a one-dimensional coordinate, and a two-dimensional coordinate and a three-dimensional coordinate may be obtained by expanding the foregoing steps. A detailed process is not described in detail herein.

Similarly, when a first coordinate of a geo-fence is a set of multiple coordinates, as long as the foregoing iterative offset estimation method is used for each coordinate in the first coordinate, a coordinate of each coordinate converted to a second coordinate system may be calculated. Therefore, a set of calculated coordinates in the second coordinate system is a second coordinate representing the geo-fence in the second coordinate system.

In this embodiment, converting the first coordinate of the geo-fence into the second coordinate using the iterative offset estimation algorithm can satisfy requirements for converting different coordinate systems, may be applied to geo-fencing using different coordinate systems, and has a broader application range.

For convenience of understanding, the method for implementing geo-fencing in this embodiment of the present disclosure is described below using an actual application scenario.

In this embodiment, the mobile device is a mobile phone. A touch screen of the mobile phone displays a map when the geo-fence is set, and a coordinate system used by the map is BD09. A user manually encircles a geographic area on the map by sliding on the touch screen. The mobile phone obtains coordinate values of points at edges of the geographic area and sets the coordinate values of the points to a geo-fence. Therefore, a coordinate system used by the geo-fence is BD09. A first coordinate representing the geo-fence in the coordinate system BD09 is determined when the mobile phone detects that the geo-fence is set.

A coordinate system that is preset in the mobile phone, that is set to implement geo-fencing, and that is used by a positioning technology is a Global Navigation Satellite System (GLONASS), and a coordinate system used by the GLONASS is PE-90. A conversion model needed to convert the coordinate system PE-90 into the coordinate system BD09 is prestored in the mobile phone.

The mobile phone converts each coordinate value in the first coordinate into a second coordinate representing the geo-fence in the coordinate system PE-90 using the iterative offset estimation algorithm to.

After the second coordinate is calculated, the mobile phone enables a GLONASS positioning function according to the specified positioning technology in order to position the mobile phone. A positioning frequency is preset in the mobile phone. A coordinate of a positioning result is obtained at intervals after the positioning function is enabled, and the coordinate of the positioning result is compared with the second coordinate.

The mobile phone sends a reminder indicating that the mobile phone is about to enter an area when the coordinate of the positioning result is located outside the geo-fence, and a minimum distance to the geo-fence is less than or equal to 5 meters. The mobile phone automatically logs in to a social network of an area, and pushes advertisement information related to the area when a real-time positioning result is located inside the geo-fence. The mobile phone automatically exits the social network of the area when the real-time positioning result is located outside the geo-fence, and a distance to the geo-fence is greater than 5 meters.

Figure 3:
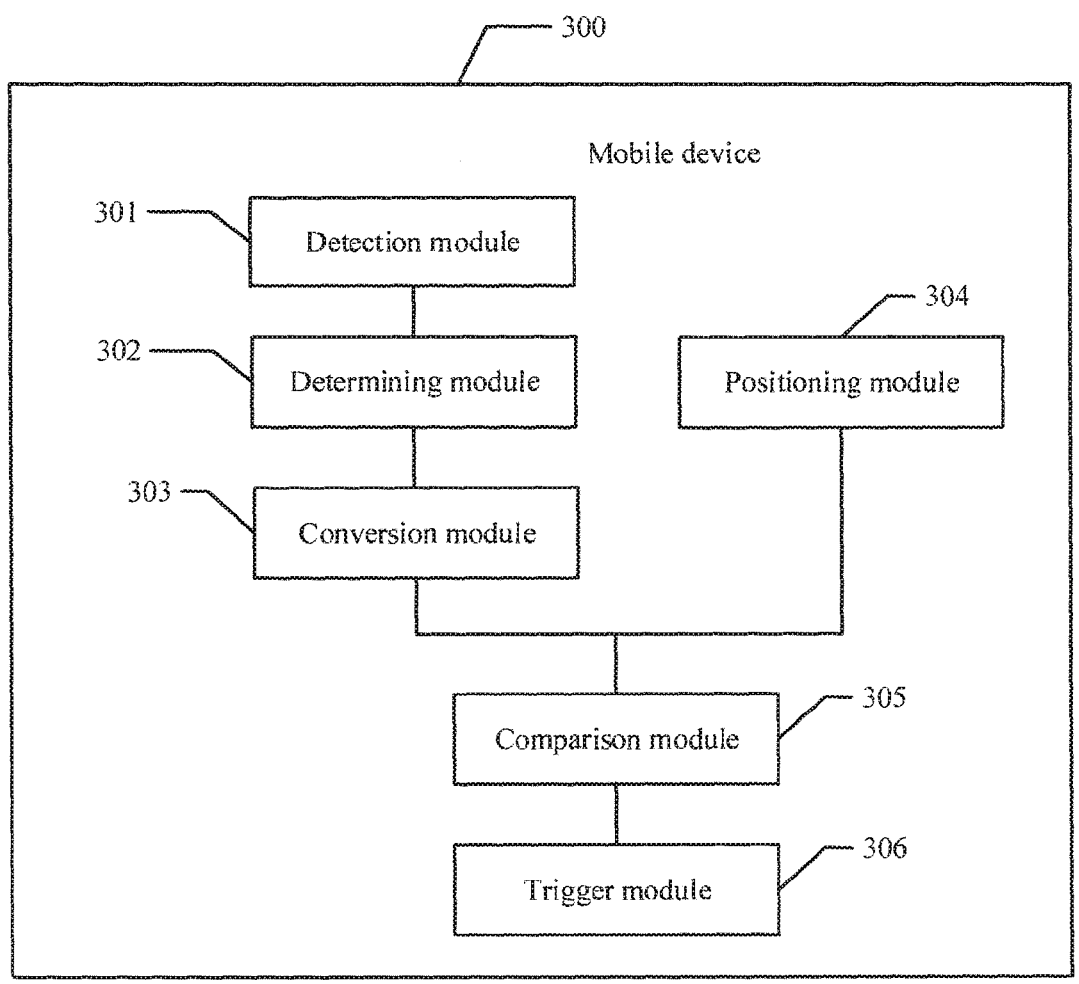
FIG. 3 is a schematic structural diagram of an embodiment of a mobile device according to the present disclosure.

The method for implementing geo-fencing in the embodiment of the present disclosure is described above, and a mobile device in an embodiment of the present disclosure is described below. Referring to FIG. 3, the mobile device 300 in this embodiment of the present disclosure includes a detection module 301 configured to detect whether a geo-fence is set, a determining module 302 configured to determine a first coordinate representing the geo-fence in a first coordinate system when the detection module 301 detects that the geo-fence is set, where the first coordinate system is a coordinate system used by the geo-fence, a conversion module 303 configured to convert the first coordinate determined by the determining module 302 into a second coordinate representing the geo-fence in a second coordinate system, where the second coordinate system is a coordinate system that is set to implement geo-fencing and that is used by a positioning technology, and the first coordinate system is different from the second coordinate system, a positioning module 304 configured to determine a positioning result of the mobile device 300 using the positioning technology, a comparison module 305 configured to compare a coordinate of the positioning result determined by the positioning module 304 with the second coordinate representing the geo-fence, and a trigger module 306 configured to trigger a preset event when a relationship between the coordinate of the positioning result determined by the positioning module 304 and the second coordinate representing the geo-fence satisfies a trigger condition.

In this embodiment, because before a positioning result determined using a positioning technology is obtained, a first coordinate of a geo-fence in a first coordinate system used by the geo-fence is first converted into a second coordinate representing the geo-fence in a second coordinate system used by the positioning technology. In this way, when each positioning result is compared with the geo-fence subsequently, the positioning result does not need to be converted into a positioning result in a coordinate system used by a geo-fence. Coordinate conversion is performed only once in a whole process. Compared with the background technology in which coordinate conversion needs to be performed on each positioning result once, the present disclosure can greatly lower operation complexity of geo-fencing in order to lower power consumption of geo-fencing, and can resolve a location deviation problem caused by different coordinate systems of a geo-fence and a positioning result.

Optionally, the conversion module 303 is further configured to convert the first coordinate into the second coordinate representing the geo-fence in the second coordinate system using an iterative offset estimation algorithm.

Optionally, the conversion module 303 is further configured to convert the first coordinate into the second coordinate representing the geo-fence in the second coordinate system according to a preset conversion model.

Preferably, the mobile device 300 includes an AP (not shown), and a low-power-consumption processor (not shown) or a low-power-consumption SoC (not shown) that is independent of the AP and whose power consumption is less than that of the AP. The comparison module 305 is further implemented in the low-power-consumption processor or the low-power-consumption SoC.

For convenience of understanding, the mobile device 300 in this embodiment of the present disclosure is described below using an actual application scenario.

Figure 4:
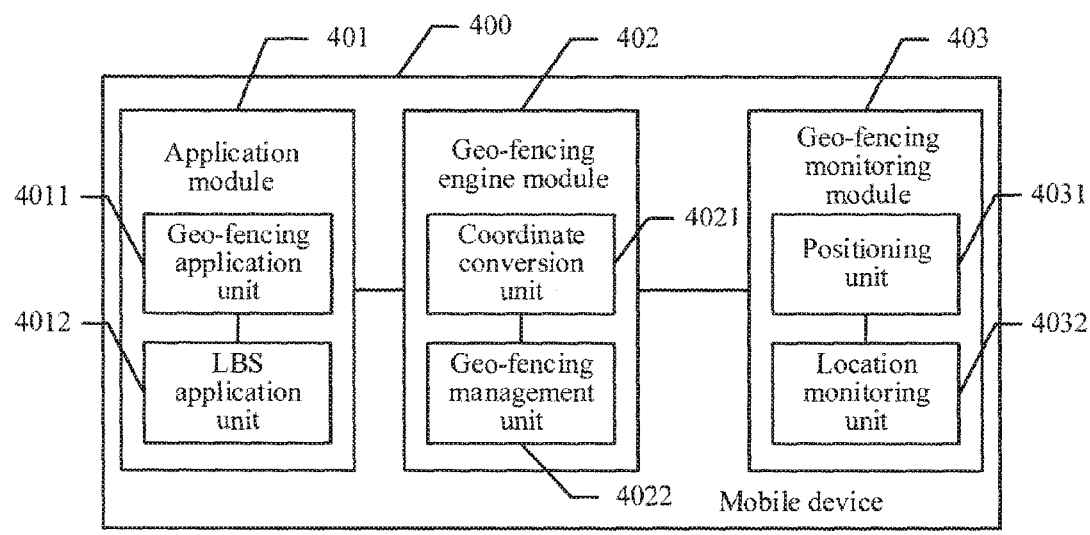
FIG. 4 is a schematic structural diagram of another embodiment of a mobile device according to the present disclosure.

Referring to FIG. 4, FIG. 4 is a schematic structural diagram of another embodiment of a mobile device 400 according to the present disclosure. In this embodiment, the mobile device 400 includes an application module 401, a geo-fencing engine module 402, and a geo-fencing monitoring module 403. The application module 401 and the geo-fencing monitoring module 403 separately establish a connection to the geo-fencing engine module 402 and perform communication using the geo-fencing engine module 402.

The application module 401 includes a geo-fencing application unit 4011. The geo-fencing application unit 4011 is configured to set a geo-fence and a positioning technology that is used for implementing geo-fencing, set a preset event to be performed when a trigger condition for the geo-fence is satisfied, and perform the preset event when the trigger condition is satisfied.

Preferably, the geo-fencing application unit 4011 is configured to determine a first coordinate representing the geo-fence in a first coordinate system when it is detected that the geo-fence is set, where the first coordinate system is a coordinate system used by the geo-fence.

Optionally, the geo-fencing application unit 4011 may be further configured to edit, delete, activate, or disable the geo-fence. Alternatively, the geo-fencing application unit 4011 may further set a positioning operation mode. The positioning operation mode may include two types, where one type is performing positioning using only one positioning technology, and the other type is performing positioning using at least two location technologies. Alternatively, when the geo-fencing application unit 4011 sets at least two geo-fences, the geo-fencing application unit 4011 is further configured to set priorities of trigger events corresponding to geo-fences such that when trigger conditions for the at least two geo-fences are simultaneously satisfied, the geo-fencing application unit 4011 can perform preset events corresponding to the geo-fences according to the priorities.

Preferably, the application module 401 may further include a location based service (LBS) application unit 4012. The LBS application unit 4012 may provide a set virtual fence to the geo-fencing application unit 4011. The geo-fencing application unit 4011 may load a virtual fence in the LBS application unit 4012 as a geo-fence when setting the geo-fence. Alternatively, the LBS application unit 4012 may preset a preset event to be triggered when a trigger condition for the geo-fence is satisfied and trigger the preset event when the trigger condition for the geo-fence is satisfied.

The geo-fencing engine module 402 includes a coordinate conversion unit 4021 and a geo-fencing management unit 4022.

The coordinate conversion unit 4021 is configured to convert the determined first coordinate into a second coordinate representing the geo-fence in a second coordinate system, where the second coordinate system is a coordinate system that is set to implement geo-fencing and that is used by a positioning technology, and the first coordinate system is different from the second coordinate system.

The geo-fencing management unit 4022 is configured to start a positioning unit 4031 according to the positioning technology that is set by the geo-fencing application unit 4011 and that is used for implementing geo-fencing (see description below). When the positioning operation mode is further set in the geo-fencing application unit 4011, the geo-fencing management unit 4022 is further configured to start the positioning unit 4031 according to the positioning operation mode that is set by the geo-fencing application unit 4011.

The geo-fencing monitoring module 403 includes the positioning unit 4031 and a location monitoring unit 4032. The positioning unit 4031 is configured to determine a positioning result of the mobile device 400 according to the positioning technology that is set by the geo-fencing application unit 4011 and further send the positioning result to the location monitoring unit 4032.

The location monitoring unit 4032 compares the positioning result received from the positioning unit 4031 with the second coordinate received from the coordinate conversion unit 4021 to determine whether a trigger condition is satisfied between the positioning result and the geo-fence, and if a trigger condition is satisfied between the positioning result and the geo-fence, sends a geo-fence status change notification to the geo-fencing management unit 4022, and the geo-fencing management unit 4022 triggers the application module 401 to perform the preset event.

Preferably, the location monitoring unit 4032 is set in a low-power-consumption processor independent of an AP or is integrated in a low-power-consumption SOC independent of an AP in order to lower a calling frequency for the AP in order to lower running power consumption of geo-fencing.

Figure 5:
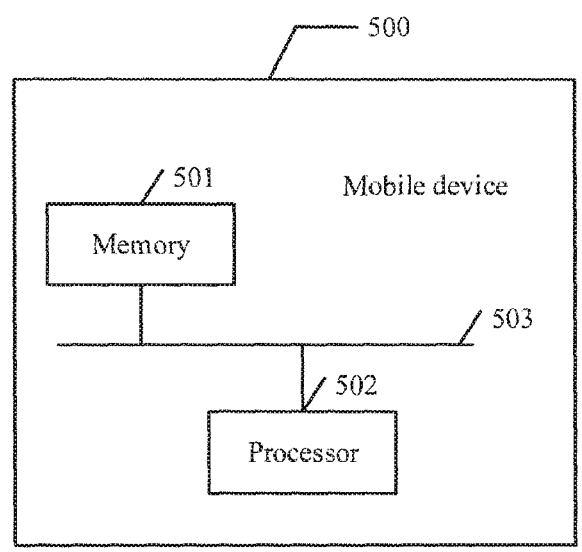
FIG. 5 is a schematic structural diagram of still another embodiment of a mobile device according to the present disclosure.

The mobile device 400 in this embodiment of the present disclosure is described above from the perspective of unitization of functional entities, and a mobile device in an embodiment of the present disclosure is described below from the perspective of hardware processing. Referring to FIG. 5, FIG. 5 is a schematic structural diagram of still another embodiment of a mobile device 500 according to the present disclosure. In this embodiment, the mobile device 500 includes a memory 501 and a processor 502. The memory 501 and the processor 502 are connected using a bus 503.

The memory 501 stores one group of program code, the processor 502 is configured to call the program code stored in the memory 501 and perform the operations of determining a first coordinate representing the geo-fence in a first coordinate system when it is detected that a geo-fence is set, where the first coordinate system is a coordinate system used by the geo-fence, converting the first coordinate into a second coordinate representing the geo-fence in a second coordinate system, where the second coordinate system is a coordinate system that is set to implement geo-fencing and that is used by a positioning technology, and the first coordinate system is different from the second coordinate system, comparing a coordinate of a positioning result determined using the positioning technology with the second coordinate representing the geo-fence, and triggering a preset event when a relationship between the coordinate of the positioning result and the second coordinate representing the geo-fence satisfies a trigger condition.

Preferably, the processor 502 is further configured to convert the first coordinate into the second coordinate representing the geo-fence in the second coordinate system using an iterative offset estimation algorithm.

Preferably, the processor 502 is further configured to convert the first coordinate into the second coordinate representing the geo-fence in the second coordinate system according to a preset conversion model.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In addition, an embodiment of the present disclosure further provides a computer readable medium, including a computer readable instruction that performs the following operation when being executed. Performing steps 101 to 104 in the foregoing embodiment, which are not described herein again.

In addition, an embodiment further provides a computer program product, including the foregoing computer readable medium.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A method for implementing geo-fencing, comprising:
    determining a first coordinate representing a geo-fence in a first coordinate system when it is detected that the geo-fence is set, wherein the first coordinate system is a coordinate system used by the geo-fence;
    converting the first coordinate into a second coordinate representing the geo-fence in a second coordinate system, wherein the second coordinate system is a coordinate system set to implement the geo-fencing and used by a positioning technology, and wherein the first coordinate system is different from the second coordinate system;
    comparing a coordinate of a positioning result determined using the positioning technology with the second coordinate representing the geo-fence; and
    triggering a preset event when a relationship between the coordinate of the positioning result and the second coordinate representing the geo-fence satisfies a trigger condition.

2. The method for implementing the geo-fencing according to claim 1, wherein converting the first coordinate into the second coordinate comprises converting the first coordinate into the second coordinate representing the geo-fence in the second coordinate system using an iterative offset estimation algorithm.

3. The method for implementing the geo-fencing according to claim 1, wherein converting the first coordinate into the second coordinate comprises converting the first coordinate into the second coordinate representing the geo-fence in the second coordinate system according to a preset conversion model.

4. A mobile device, comprising:
    a memory configured to store one group of program code; and
    a processor coupled to the memory, wherein the one group of program code stored in the memory causes the processor to be configured to:
        determine a first coordinate representing a geo-fence in a first coordinate system when it is detected that the geo-fence is set, wherein the first coordinate system is a coordinate system used by the geo-fence;
        convert the first coordinate into a second coordinate representing the geo-fence in a second coordinate system, wherein the second coordinate system is a coordinate system set to implement geo-fencing and used by a positioning technology, and wherein the first coordinate system is different from the second coordinate system;
        compare a coordinate of a positioning result determined using the positioning technology with the second coordinate representing the geo-fence; and
        trigger a preset event when a relationship between the coordinate of the positioning result and the second coordinate representing the geo-fence satisfies a trigger condition.

5. The mobile device according to claim 4, wherein the one group of program code stored in the memory further causes the processor to be configured to convert the first coordinate into the second coordinate representing the geo-fence in the second coordinate system using an iterative offset estimation algorithm.

6. The mobile device according to claim 4, wherein the one group of program code stored in the memory further causes the processor to be configured to convert the first coordinate into the second coordinate representing the geo-fence in the second coordinate system according to a preset conversion model.

7. A non-transitory computer readable medium comprising computer readable instructions that, when executed by a computer processor, cause the computer processor to implement the following operations of:
    determining a first coordinate representing a geo-fence in a first coordinate system when it is detected that the geo-fence is set, wherein the first coordinate system is a coordinate system used by the geo-fence;
    converting the first coordinate into a second coordinate representing the geo-fence in a second coordinate system, wherein the second coordinate system is a coordinate system set to implement geo-fencing and used by a positioning technology, and wherein the first coordinate system is different from the second coordinate system;
    comparing a coordinate of a positioning result determined using the positioning technology with the second coordinate representing the geo-fence; and
    triggering a preset event when a relationship between the coordinate of the positioning result and the second coordinate representing the geo-fence satisfies a trigger condition.

8. The non-transitory computer readable medium according to claim 7, wherein when converting the first coordinate into the second coordinate, the computer readable instructions further cause the computer processor to implement the following operation of converting the first coordinate into the second coordinate representing the geo-fence in the second coordinate system using an iterative offset estimation algorithm.

9. The non-transitory computer readable medium according to claim 7, wherein when converting the first coordinate into the second coordinate, the computer readable instructions further cause the computer processor to implement the following operation of converting the first coordinate into the second coordinate representing the geo-fence in the second coordinate system according to a preset conversion model.

\* \* \* \* \*